United States Patent [19]
Adkins

[11] 3,970,778
[45] July 20, 1976

[54] MONOLITHIC ACOUSTOELECTRIC IMAGE PICK-UP DEVICE

[75] Inventor: Larry R. Adkins, Tustin, Calif.

[73] Assignee: Rockwell International Corporation, El Segundo, Calif.

[22] Filed: June 18, 1975

[21] Appl. No.: 588,102

[52] U.S. Cl. .............................. 178/7.1; 250/211 J; 250/578; 310/8.1; 310/8.3; 310/9.8
[51] Int. Cl.² .......................................... H04N 5/30
[58] Field of Search ..................... 178/7.1, DIG. 18; 250/211 R, 211 J, 578; 310/8.1, 8.3, 9.8

[56] References Cited
UNITED STATES PATENTS 3,826,865   7/1974   Quate et al. .......................... 178/7.1
3,826,866   7/1974   Quate et al. .......................... 178/7.1

Primary Examiner—Robert L. Richardson
Attorney, Agent, or Firm—H. Fredrick Hamann; G. Donald Weber, Jr.; Gilbert H. Friedman

[57] ABSTRACT

Monolithic acoustoelectric imager using a multistrip coupled convolver. The multistrip coupler of the convolver senses the electric fields associated with counter-propagating surface acoustic waves on a piezoelectric film. The interaction product of the sensed electric fields scans a screen including one or more strips of radiation-sensitive semiconductor material and the convolver output is modulated by the varying intensity of illumination from an image projected onto the screen.

9 Claims, 10 Drawing Figures

MONOLITHIC ACOUSTOELECTRIC IMAGE PICK-UP DEVICE

BACKGROUND OF THE INVENTION

1. Field of the Invention

The present invention relates generally to solid state imaging devices and, more particularly, to a new and improved acoustoelectric imager using a monolithic multistrip coupled convolver adapted to receive a projected image on a screen of radiation-sensitive semiconductor material.

2. Description of the Prior Art

The operation of acoustoelectric convolvers is based on the interaction of the normal components of the electric fields generated by two oppositely directed surface acoustic waves counter-propagating on a piezoelectric film or substrate with the charge carriers in a layer or wafer of semiconductor material. Earlier devices of this type employ a piezoelectric substrate of lithium niobate and a wafer of silicon spaced above the acoustic beam, or propagation path for the acoustic waves, on the substrate. The air gap spacing between the piezoelectric substrate and the silicon wafer is on the order of 1000 angstroms. For a discussion of such devices see, for example, G. S. Kino, W. R. Shreve, and H. R. Gautier, "Parametric Interactions of Rayleigh Waves," 1972 *Ultrasonic Symposium Proceedings*, IEEE Cat. No. 72 CHO 708–8SU, pages 285–287 and J. M. Smith, E. Stern, and Abraham Bers, "Accumulation-Layer Surface-Wave Convolver," *Electronics Letters*, Vol. 9, No. 6, Mar. 22, 1973, pages 145–146. In the air-gap convolvers discussed in the above-referenced articles, the output signal is sensed across a pair of electrodes, one on the outer or top surface of the semiconductor wafer and one on the bottom or outer surface of the piezoelectric substrate.

In Gordon S. Kino and John Shaw, "Acoustic Surface Waves," *Scientific American*. Oct. 1972, pages 51–68, there is shown and discussed an air gap convolver operated as an imager wherein one line of an object is projected onto the semiconductor wafer through the piezoelectric substrate. The imager output is obtained by detecting one of the two counterpropagating surface acoustic waves at an interdigital transducer positioned to transduce the wave into an electrical signal after that wave has emerged from the interaction region between the semiconductor and the substrate. Scanning of the object in a direction orthogonal to the line is accomplished mechanically. The same device is discussed in more detail in N. J. Moll and C. F. Quate, "Scanning Optical Patterns with Acoustic Surface Waves," *J. de Physique*, Colloque C6, supplement to No. 11–12, Tome 33, page 231, Nov.–Dec. 1972.

A major disadvantage of air-gap convolvers is that a configuration which requires a semiconductor wafer to be precisely and uniformly spaced across an air gap from a piezoelectric substrate is difficult and expensive to manufacture in quantity to the tolerances required for consistent results. However, if the semiconductor wafer is placed in direct contact with the piezoelectric substrate, it interferes with the propagation of surface acoustic waves thereon. Recent interest has focused on the utilization of multistrip couplers which are arrays of parallel closely spaced narrow strips of conductor material disposed on the surface of a piezoelectric surface acoustic wave propagation medium perpendicular to the wave vectors. The multistrip coupler spans the acoustic beam and extends outward therefrom. Such a multistrip coupler is described in F. G. Marshall and E. G. S. Paige, "Novel Acoustic-Surface-Wave Directional Coupler with Diverse Applications," *Electronics Letters*, Vol. 7, No. 16, Aug. 12, 1971, pages 460–462. A multistrip coupler may be used to couple the normal components of electric fields associated with surface acoustic waves propagating on a piezoelectric film on a substrate to an adjacent region of the same substrate or to a similar distinct substrate. A strip of semiconductor material can then be placed in contact with the multistrip coupler outside the acoustic beam without interfering with the surface acoustic waves. A multistrip coupled convolver having a silicon chip with a thin silicon dioxide coating of controlled thickness mechanically pressed into contact with the coupling strips of the multistrip coupler is described in W. R. Shreve and G. S. kino, "Strip Coupled Acoustic Convolvers," 1973 *Ultrasonics Symposium Proceedings*, IEEE Cat. No. 73 CHO 807–8SU, pages 145–147.

While the mechanical contact model for a multistrip coupled convolver offers some advantages over air gap devices, the most promising possibility for the utilization of the multistrip coupled concept for convolvers is in its application to monolithic structures where the piezoelectric and semiconductor media are films deposited side by side on the same crystalline substrate. This approach has the advantage of enabling the fabrication of convolver devices to close tolerances in production quantities by the well established and relatively inexpensive techniques currently in use for the manufacture of integrated circuits.

Monolithic multistrip coupled convolvers are discussed by the inventor of the subject invention in L. R. Adkins, "Strip Coupled AlN and Si on Sapphire Convolvers," 1973 *Ultrasonics Symposium Proceedings*, IEEE Cat. No. 73 CHO 807–8SU, pages 148–151 and in L. R. Adkins, "Monolithic Aluminum Nitride/Silicon-on-Sapphire Strip Coupled Convolvers," 1974 *Ultrasonics Symposium Proceedings*, IEEE Cat. No. 74 CHO 896–1SU, pages 228–231.

SUMMARY OF THE INVENTION

This invention provides an acoustoelectric imager and imaging system employing a multistrip coupled convolver which is preferably monolithic in structure. The multistrip coupler of the convolver senses the electric fields associated with the counter-propagating surface acoustic waves on a piezoelectric film. The interaction product of the sensed electric fields scans a screen including one or more strips of radiation-sensitive semiconductor material and the convolver output is modulated by the varying intensity of illumination from an image projected onto the screen. The semiconductor material included in the screen is preferably deposited on the same substrate as the piezoelectric film. Each strip of radiation-sensitive semiconductor material is included in a multilayer structure of insulators and electrodes. Every part of the multilayered structure which is interposed in a beam path between the source of a projected image intended to illuminate the semiconductor strip and the semiconductor strip itself is transparent to the projected image. Where the screen has a plurality of strips of semiconductor material, a complete two-dimensional image may be projected thereon and the full image is then sequentially scanned line by line in the direction orthogonal to the semiconductor strips by electrical means in an imager system rather than by machanically advancing the object or the image projection means line by line. In the two-dimensional imager embodiment, the efficiency of the multistrip coupler is maintained by controlled switching circuits adapted to bias each semiconductor strip of the screen, other than the strip being scanned at a given time, to present a high impedance to the coupler.

BRIEF DESCRIPTION OF THE DRAWINGS

In the following detailed description and the accompanying drawings, like reference numerals designate like parts.

DESCRIPTION OF THE PREFERRED EMBODIMENT

Figure 1:
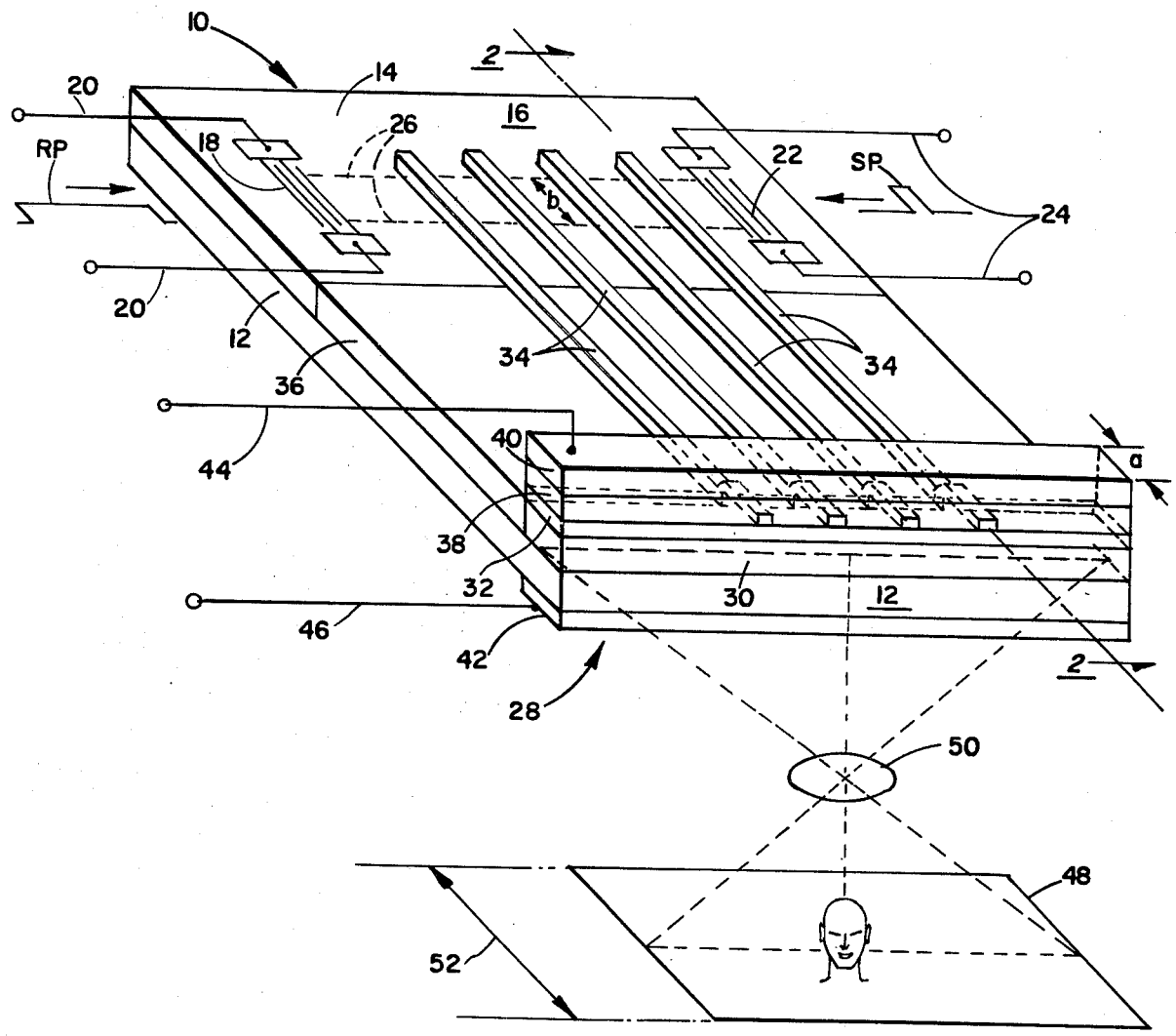
FIG. 1 is a schematic diagram, in perspective, of an acoustoelectric imager in accordance with this invention showing an image projected thereon from below the imager.

Referring now to FIG. 1, there is shown a schematic for an acoustoelectric imager 10 in the form of a monolithic multistrip coupled convolver. A film 14 of piezoelectric material is deposited on a portion of the upper surface of substrate 12 of dielectric material. The combination of the piezoelectric film 14 on the substrate 12 is capable of supporting and propagating surface acoustic waves of the Rayleigh type on the upper surface 16 of the film 14. The substrate 12 is preferably cut from a single crystal of sapphire ($Al_2O_3$) along an R-plane of the crystal. The film 14 of piezoelectric material is preferably of aluminum nitride having (1120) coherent orientation epitaxially grown on the sapphire substrate 12. This combination of an aluminum nitride film 14 on a sapphire substrate 12 exhibits a relatively high velocity of propagation for surface acoustic waves, i.e., approximately $6 \times 10^5$ cm/sec.

A first standard interdigital transducer 18 provided with connecting leads 20 is disposed on the upper surface 16 of the aluminum nitride film 14 adjacent an end thereof. A second standard interdigital transducer 22 provided with connecting leads 24 is disposed on the upper surface 16 of the aluminum nitride film 14 adjacent an end of the film 14 opposite the first transducer 18. Each of the two transducers 18 and 22 is preferably designed to transduce signal pulses from an external source (not shown) having a relatively high predetermined rf carrier frequency of, e.g., 400 MHz into surface acoustic waves traveling on the surface 16 of the film 14 along a propagation path 26 extending between the two transducers 18 and 22. The boundaries of the propagation path 26 are indicated by a pair of dashed lines in FIG. 1. The propagation path 26 is further indicated as having an acoustic beam width $b$. In the preferred embodiment, the acoustic beam width, $b$, is on the order of at least 10 wavelengths of the surface acoustic waves. However, the beam width is preferably made as wide as is practical without causing undue energy loss.

A screen 28 for receiving illumination is shown in FIG. 1. The screen 28 includes a narrow and thin strip of radiation-sensitive semiconductor material 30 deposited on a portion of the upper surface of substrate 12. Strip 30 is spaced apart from and substantially parallel to the film 14 of aluminum nitride. The strip 30 is preferably of relatively high resistivity material, for example, n-type silicon. With state-of-the-art fabrication techniques, the resistivity is on the order of 10 ohm-cm, the room temperature majority charge carrier concentration is about $1 \times 10^{15}$ $cm^3$ and the Hall mobility of the silicon is approximately 400 $cm^2$/V-sec. The silicon strip 30 has width a, as indicated in FIG. 1, which is preferably as small as is practical. With state-of-the-art silicon-on-sapphire technology, the width $a$ of the silicon strip 30 is about 5 mils. A layer 36 of insulating material is disposed on the remainder of the upper surface of substrate 12 between film 14 and strip 30.

A thin insulating layer 32 of silicon dioxide is disposed on top of the silicon strip 30. The insulating layer 32 is preferably on the order of 100 angstroms thick although it may be made somewhat thicker without significant deleterious effect on the operation of the imager 10.

The normal components of electric fields created by strain in the piezoelectric film 14 due to surface acoustic waves are coupled to the silicon strip 30 by a multistrip coupler having a plurality of coupling strips 34 of conductor material disposed substantially parallel to and spaced apart from each other. The array of coupling strips 34 spans the propagation path 26 and extends therefrom across the layer 36 of insulating material which is preferably of silicon dioxide. The coupling strips extend into the screen 28 on the insulating layer 32 of silicon dioxide where they are disposed just above and in close proximity to the silicon strip 30. FIG. 1 shows multistrip coupler having four coupling strips 34. This number of coupling strips 34 is shown for the sake of illustration only. In a multi- strip coupled convolver, it is common practice to use a great many coupling strips 34, preferably no less than about three per acoustic wavelength. For the surface acoustic wave frequency and velocity of propagation given above, about 2000 coupling strips 34 per centimeter are fabricated using techniques similar to those used for fabricating the interdigital transducers 18 and 22.

In the screen 28, the coupling strips 34 are covered by and embedded in an insulating layer 38, preferably of silicon dioxide. Covering the insulating layer 38 is a thin layer of conductor material forming a first electrode 40. A second electrode 42 of conductor material is disposed in the screen 28 on the lower surface of the substrate 12 opposite the silicon strip 30. Output signals from the electrodes 40 and 42 are coupled to a utilization device (not shown) for image signals by connecting leads 44 and 46 respectively. Connecting lead 46 may be coupled to a source of reference potential which may be ground.

In FIG. 1, there is illustrated an object 48 from which radiation is projected onto the silicon strip 30 in the screen 28 by a lens system 50. To reach the silicon strip 30, the radiation passes through the second electrode 42 and the sapphire substrate 12. Sapphire, properly polished, is transparent to a wide range of useful radiation frequencies. The electrode 42 is also fabricated from a material which is transparent to substantially the same range of radiation frequencies. For the embodiment of FIG. 1, therefore, the electrode 42 is fabricated from a transparent conducting material such as, for example, indium tin oxide (ITO) or the like. The electrode 40 at the top of the screen 28 may be fabricated by the evaporation of a thin film of metal such as, for example, aluminum onto the insulating layer 38 of silicon dioxide. Since the acoustoelectric imager 10 has only one narrow silicon strip 30 in its screen 28, only one line at a time of the object 48 will be sensed by the screen 28 for conversion into an electrical output signal. The full two-dimensional object 48 may be so projected and converted by scanning the lens system 50 sequentially, line by line, across the object 48 as indicated by the double-ended arrow 52 or, equivalently, transporting the object 48 beneath a fixed projection system as represented by the lens system 50.

Figure 2:
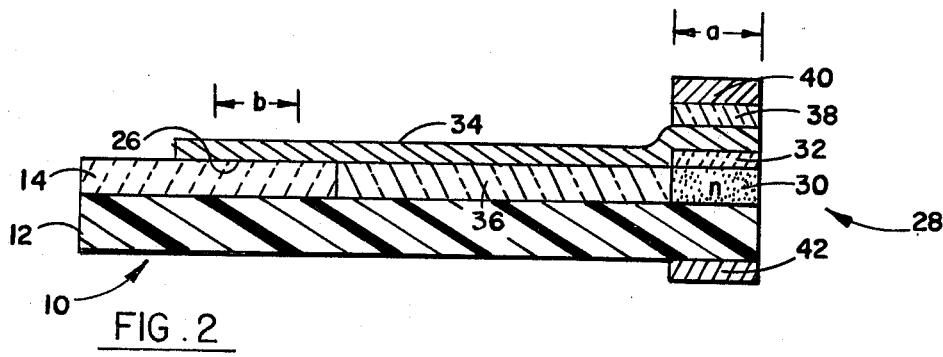
FIG. 2 shows a cross-section of the acoustoelectric imager of FIG. 1 taken on the line 2—2 of FIG. 1 looking in the direction of the arrows.

In FIG. 2, there is shown a cross-section of the acoustoelectric imager 10 of FIG. 1 taken on the line 2—2 of FIG. 1 looking in the direction of the arrows. The substrate 12 of sapphire has the piezoelectric film 14 and the silicon strip 30 having width $a$ in the screen 28 disposed on the same surface of the substrate 12 spaced apart from each other. A coupling strip 34 is shown spanning the imager 10 from side to side, i.e., from the propagation path 26 having width $b$ on the film 14 across the supporting layer 36 of silicon dioxide and over the silicon strip 30. The insulating layer of silicon dioxide 32 is interposed between the coupling strip 34 and the silicon strip 30. The electrode 40, insulated from the coupling strip 34 by the layer of silicon dioxide 38, and the electrode 42 on the lower side of the substrate 12 complete the structure of the screen 28 as illustrated herein.

The acoustoelectric imager 10 of FIGS. 1 and 2 has been shown and described as a structure wherein the screen 28 is illuminated by image projection means positioned beneath the substrate 12 with the projected radiation passing through a transparent electrode 42 and a transparent substrate 12. It will be readily apparent to those skilled in the art, from the discussion hereinabove, that image projection onto the screen 28 may be alternatively made from above the screen 28 provided the electrode 40 and the coupling strips 34 are fabricated from transparent conductor material such as the above-mentioned indium tin oxide or the like. The insulating layers of silicon dioxide 32 and 38, also disposed in the beam path for a projected image in such a configuration, are ordinarily transparent in any case for the radiation frequency range usually of interest.

Returning now to FIG. 1, there is indicated thereon a relatively long duration pulse, designated RP and commonly termed the reading pulse, shown adjacent the interdigital transducer 18. A relatively short duration pulse, designated SP and commonly termed the scanning pulse, is indicated adjacent the interdigital transducer 22. The rf carrier frequencies of the reading and scanning pulses are preferably the same, for example the above-mentioned frequency of 400 MHz. The amplitude of each pulse is held substantially constant throughout its duration. As indicated in FIG. 1, the reading and scanning pulses may be regarded as excitation pulses applied to the connecting leads 20 of interdigital transducer 18 and the connecting leads 24 of interdigital transducer 22, respectively, for being transduced into surface acoustic waves traveling in opposite directions along the piezoelectric film 14. Alternatively, the pulses may be regarded as the individual counter-propagating surface acoustic waves as would appear at any point along the propagation path 26.

Figure 3A:
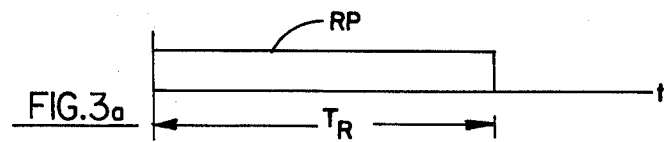
FIGS. 3a, 3b and 3c show reading and scanning pulses counter-propagating as surface acoustic waves on a piezoelectric medium.
Figure 3B:
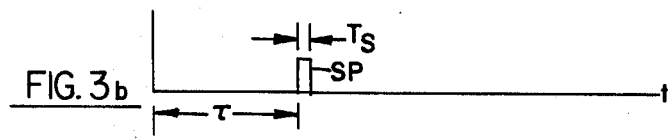
Figure 3C:
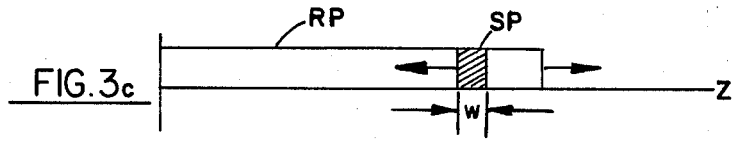

Reference is made to FIGS. 3a–3c, in conjunction with the acoustoelectric imager 10 illustrated in FIG. 1. FIG. 3a is a representation of the envelope of the reading pulse RP as a function of time at any point on the propagation path 26 including the point where it emerges from the interdigital transducer 18. The reading pulse has a duration of $T_R$ at any point along the propagation path 26. $T_R$ is at least twice as great as the time required for a surface acoustic wave to travel from one end to the other end of the propagation path 26.

In FIG. 3b, there is shown a representation of the envelope of the scanning pulse SP as a function of time at any point on the propagation path 26 including the point where it emerges from the interdigital transducer 22. The scanning pulse has a duration of $T_S$ at any such point along the propagation path 26. For maximum resolution of the projected image, $T_S$ is made as short as is practical. An interdigital transducer such as the transducer 22 can be made to have a bandwidth on the order of ten percent of its mid-band operating frequency. For the above-mentioned rf carrier frequency of 400 MHz, this bandwidth is 40 MHz. For this bandwidth, reasonably sharp acoustic wave pulses having a duration as short as 25 nanoseconds can be excited. This pulse duration is the reciprocal of the bandwidth. The launching of the scanning pulse SP from interdigital transducer 22 is delayed from the time the reading pulse RP is launched from interdigital transducer 18 by $\tau$ seconds, where $\tau$ is approximately equal to the time for a surface acoustic wave to travel the length of the propagation path 26. In other words, the timing of the counter-propagating pulses RP and SP is such that RP is present wherever SP is present along the propagation path 26 during the time required for SP to travel from one end to the other end of the propagation path 26.

FIG. 3c is a representation of the spatial distribution along the propagation path 26 of the surface acoustic waves corresponding to the counterpropagating reading and scanning pulses. RP is shown propagating in the positive Z direction while SP is shown propagating in the negative Z direction. The region along the propagation path 26 occupied by the traveling surface acoustic wave of the scanning pulse SP having length $w$ is the only region wherein both of the counter-propagating surface acoustic waves are simultaneously present or overlapping. In FIG. 3c, this overlapping signal region travels from right to left or in the negative Z direction from transducer 22 to transducer 18 (see FIG. 1). Alternatively, the overlapping signal region can be caused to travel from transducer 18 to 22 by interchanging the interdigital transducers used to transduce the reading and scanning pulses.

In effect, there are two input signals delivered to the multistrip coupler, one from each of the two counter-propagating surface acoustic waves. The two signals present in the overlapping signal region are transferred by the coupling strips 34 to a corresponding overlapping signal region of length w in the screen 28 immediately adjacent the silicon strip 30. The combination of the coupling strips 34, the thin layer 32 of silicon dioxide and the silicon strip 30 forms a plurality of devices akin to MOS varactor diodes distributed along the screen 28. These devices behave as non-linear capacitors. Those non-linear capacitors lying in the overlapping signal region mix the two input signals from the reading and scanning pulses. Given that the two signals each have the same rf carrier frequency, an interaction potential at twice that rf carrier frequency and another interaction potential which is constant, i.e., dc, are generated across a depletion layer in the silicon strip 30 in the overlapping signal region due to the non-linear interaction of the two coupled fields with the charge carriers in the silicon. To a first approximation, the rf interaction potential across the depletion layer is proportional to the product of the amplitude of electric fields induced by each of the two surface acoustic waves. The dc interaction potential is proportional to the sum of the squares of the amplitudes of the same electric fields.

Each such potential is inversely proportional to the charge carrier density in the silicon strip. As the overlapping signal region is caused to travel, or scan, across the screen from one end to the other, the interaction potentials are detected across the electrodes 40 and 42. As the intensity of the illumination from a projected image varies along the length of the silicon strip 30, the interaction potentials will be modulated by that variation in intensity due to the variations in charge carrier density caused by the illumination. The modulated rf signal at twice the frequency of the transduced surface acoustic waves is the image output signal which can be delivered to a utilization device by way of output leads 44 and 46.

In an article by Gordon S. Kino and William R. Shreve, "Theory of Strip Coupled Acoustic Devices," *Journal of Applied Physics*, Vol. 44, No. 9, September 1973, pages 3960–3968, it is shown that a multistrip coupler may be analyzed in terms of an equivalent circuit wherein the multistrip coupler excited by surface acoustic waves propagating on a piezoelectric medium is represented as a voltage source in series with a first capacitor while the MOS varactor diode load on the multistrip coupler is represented as a second capacitor in series with a resistor. It is shown in the article referenced immediately above that maximum energy transfer from the acoustic beam to the load represented by the distributed varactor diodes is achieved when the ratio a/b, i.e., the ratio of the width of the silicon strip 30 to the acoustic beam width, is made as small as possible.

Figure 4:
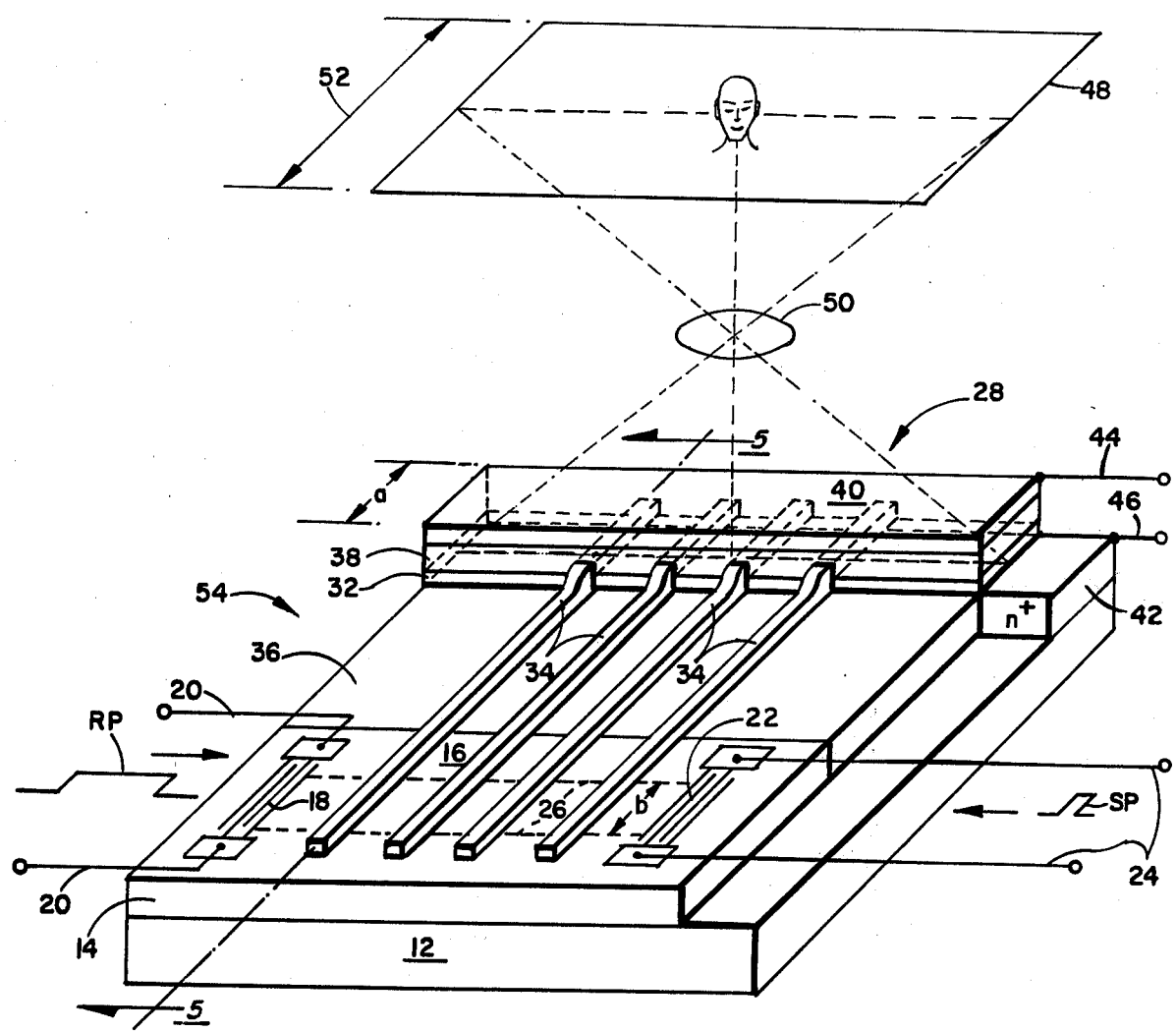
FIG. 4 is a schematic diagram, in perspective, of an acoustoelectric imager in accordance with this invention showing an image projected thereon from above the imager.
Figure 5:
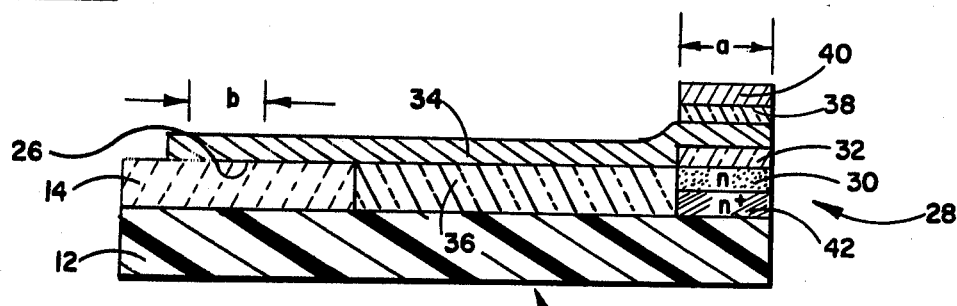
FIG. 5 shows a cross-section of the acoustoelectric imager of FIG. 4 taken along the line 5—5 of FIG. 4 looking in the direction of the arrows.

FIG. 4 is a schematic for an acoustoelectric imager 54 in the form of a monolithic multistrip coupled convolver the structure of which is modified from, but similar in almost all respects to, the acoustoelectric imager 10 of FIGS. 1 and 2. The operation of the device of FIG. 4 is the same as explained in connection with FIGS. 1, 2 and 3a–3c. FIG. 5 shows a cross-section of the acoustoelectric imager 54 of FIG. 4. Referring first to FIG. 5, it will be seen that the electrode 42 in the screen 28 is a layer of highly doped $n^+$-type silicon epitaxially deposited on the upper surface of the substrate 12. The electrode 42 of $n^+$-type silicon has a charge carrier density which is preferably at least two orders of magnitude greater than the strip of radiation-sensitive n-type silicon 30 which is deposited directly on the electrode 42 in ohmic contact therewith. By placing the electrode 42 on the upper surface of the substrate 12, the output impedance of the screen 28 for electrical image signals is reduced in that the voltage across the depletion layer of the silicon strip 30 need not be detected through the substrate 12. As indicated in FIG. 4, the acoustoelectric imager 54 is best suited for the projection of images on the screen 28 thereof from above through a transparent first electrode 40, through a transparent layer of insulating material 38, through transparent coupling strips 34, and through a thin transparent layer of insulating material 32 as was discussed in connection with FIGS. 1 and 2. The acoustoelectric imager 54 is not well suited for the projection of images on the screen 28 thereof from below the imager 54 through the substrate 12. That is because the relatively high charge carrier density in the $n^+$-type silicon of the electrode 42 will tend to cause absorption of radiation projected on it before the radiation can reach the silicon strip 30.

As indicated in FIG. 4, that portion of the electrode 42 which extends beyond the screen 28 is made relatively thicker than the portion of it within the screen 28 to adapt the electrode 42 for the connection to it of the lead 46 by, for example, thermocompression bonding. However, this configuration is not required.

Figure 6:
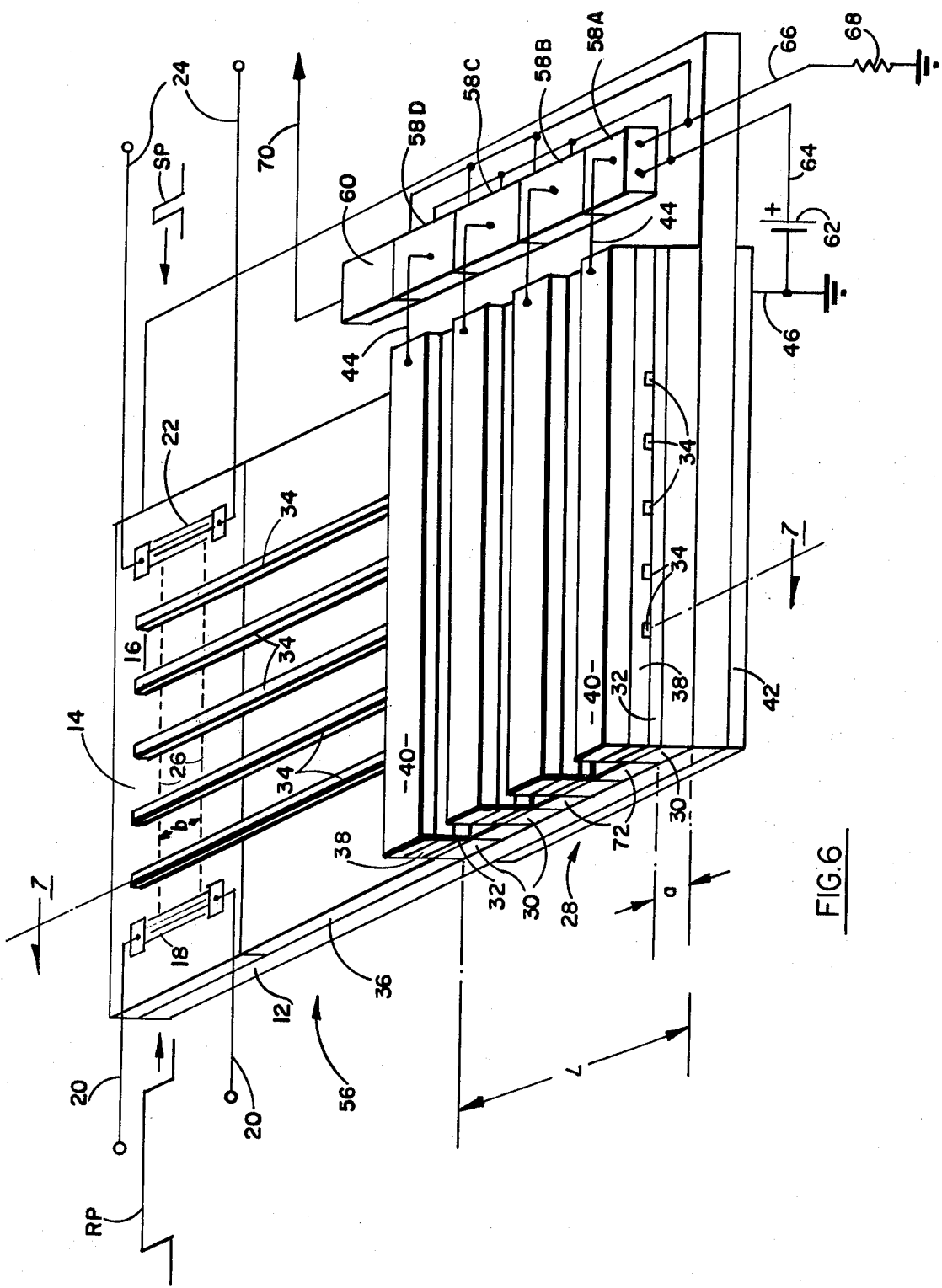
FIG. 6 is a schematic diagram, in perspective, of an acoustoelectric imager in accordance with this invention having a screen for accommodating two-dimensional images.

Referring now to FIG. 6, there is shown an embodiment of the subject invention which is a acoustoelectric imager 56 having a screen 28 of length L. The screen 28 is therefore capable of having a complete two-dimensional image projected thereon. The imager 56 has structural features similar to those shown and discussed in connection with FIGS. 1 and 2. Of course, a two-dimensional imager having a structure similar to that shown and discussed in connection with FIGS. 4 and 5 can be built also as will be apparent to those skilled in the art. The acoustoelectric imager 56 is supplied with a screen 28 having a plurality of substantially identical silicon strips 30 disposed parallel to and spaced apart from each other on the sapphire substrate 12. Although four such silicon strips 30 are shown in FIG. 6 for illustration only, state-of-the-art silicon-on-sapphire fabrication techniques permit the screen 28 to be fabricated with about 130 such silicon strips 30 per inch. Typically, each strip 30 is about 5 mils wide and is spaced apart from the others about half that width. For maximum resolution of the projected image, as many silicon strips 30 as are practical to fabricate should be used. The multistrip coupler comprising the array of coupling strips 34 extends from the propagation path 26 on the piezoelectric film 14 across the supporting layer of silicon dioxide 36 and, in addition, extends over all of the plurality of silicon strips 30 in the screen 28. As discussed before, the coupling strips 34 are separated from each silicon strip 30 by a thin layer of silicon dioxide 32. Between the silicon strips 30, the coupling strips 34 are supported on strips of insulating material 72 which may also be of silicon dioxide. Each element of the screen 28 having a silicon strip 30 therein has an electrode 40 disposed on an insulating layer 38 of silicon dioxide to insulate the electrode 40 from the coupling strips 34. Electrode 42 is disposed on the lower surface of the substrate 12 over the entire area of the screen 28. As discussed before hereinabove, every material used in the acoustoelectric imager 56 which is in a beam path for an image projected onto the silicon strips 30 of the screen 28 is transparent to the projected image. These same structural features of the acoustoelectric imager 56 and may be more clearly discerned in FIG. 7 which shows a cross-section of the acoustoelectric imager 56.

It is apparent that the use of a monolithic multistrip coupled convolver for acoustoelectric imaging makes possible the construction of an imaging device having a screen 28 capable of accommodating a two-dimensional image projected thereon. However, such an imaging device requires only a single means for transducing counter-propagating surface acoustic waves to scan all of the image lines projected onto the plurality of elongated silicon strips 30 of radiation-sensitive semiconductor material incorporated in the screen 28. This results from the capability of a multistrip coupler to be disposed to simultaneously transfer energy from a single acoustic beam on a piezoelectric film 14 to a plurality of such strips 30 simply by extending the multistrip coupler to span all such strips 30 of radiation-sensitive material in a screen 28. A two-dimensional screen could be constructed using prior art air gap convolvers but each radiation-sensitive element in such a screen would require its own distinct means for transducing counter-propagating surface acoustic waves to scan the line image projected on each such element.

As discussed hereinabove, a multistrip coupler excited by surface acoustic waves propagating on a piezoelctric medium may be regarded as a voltage source in series with a first capacitor while a strip of semiconductor material spanned by the multistrip coupler may be regarded as a distributed varactor diode having an equivalent circuit consisting of a second capacitor in series with a resistor. In the acoustoelectric imager of FIGS. 6 and 7, the multistrip coupler spans a plurality of strips 30 of radiation-sensitive semiconductor material. Thus, the load on the multistrip coupler comprises a large number of branches connected in parallel, each branch having a second capacitor in series with a resistor. The effective ratio of semiconductor strip width to acoustic beam width in this case would be $Na/b$ where N is the number of strips 30 spanned by the multistrip coupler. When N is large, as is desirable for good imager resolution, the energy transfer from the acoustic beam to each distinct silicon strip 30 may be significantly reduced and the utility of the acoustoelectric imager 56 may be seriously degraded. In the preferred embodiment of the two-dimensional acoustoelectric imager 56 of FIG. 6, the screen 28 is controlled so that only one line of an image is scanned at a time, the entire image being scanned sequentially line by line. In FIG. 6, each electrode 40 of each multilayered element in the screen 28 is shown connected by an output lead 44 to a switch. The several switches for the electrodes 40 are indicated in block form in FIG. 6 and designated 58A–58D, inclusive. Each of the switches 58A–58D is designed to be, in effect, a single-pole double-throw switch having two mutually exclusive conditions. In the first switch condition, an image output signal is connected from an electrode 40 through its output lead 44 and a conductor 66 to a utilization device represented in FIG. 6 as a resistor 68. In the second switch condition, a positive bias is applied across an n-type silicon strip 30 by connecting an electrode 40 to a reference voltage, represented in FIG. 6 by a battery 62, by way of the electrode's output lead 44 and a conductor 64. By placing a sufficiently large positive bias across a multilayered element in the screen 28, a depletion layer having significant width is created in the silicon strip 30 of that element. The depletion layer greatly decreases the capacitance of the capacitor in its equivalent load circuit. Consequently, the impedance thereof is increased to the point where it represents a negligible load on the multistrip coupler. In accordance with the subject invention, every switch 58A–58D inclusive, is controlled so that only one such switch is in its first condition at a given time connecting an electrode 40 to a utilization device 68 for image output signals. All of the remaining switches are in their second conditions for applying a bias to all of the electrodes 40 save one. Thus, in effect, only one element of the screen 28 is loading the multistrip coupler at any one time preserving, for the two-dimensional acoustoelectric imager 56, the efficiency and output signal strength of single line acoustoelectric imagers such as those shown and discussed in connection with FIGS. 1, 2, 4 and 5.

It will be understood that while only four switches 58A, 58B, 58C and 58D are indicated in FIG. 6, this is for illustration only. One such switch will be provided for each of the large number of multilayered elements included in a screen 28 of an imager 56 built in accordance with this invention. The switches may be in the form of diode bridge switching circuits which are well known to those skilled in the art. Such diode bridge circuits are capable of operating at very high speeds, i.e., having a switching time on the order of one nanosecond, when fabricated directly on a sapphire substrate by standard silicon-on-sapphire technology. The switches may be fabricated on the same substrate 12 on which the multistrip coupled convolver of the imager 56 is fabricated as shown in FIG. 6 or on a separate substrate. Alternatively, the switches may be fabricated using high-speed schottky diodes or the like. Control circuits 60 for sequencing the switches and for other purposes are indicated generally in FIG. 6 as being fabricated on the substrate 12 by standard silicon-on-sapphire technology also. However, the control circuits 60 may be assembled off the substrate 12 if that is deemed preferable. The control circuits are discussed more fully hereinafter in connection with FIG. 8.

Figure 7:
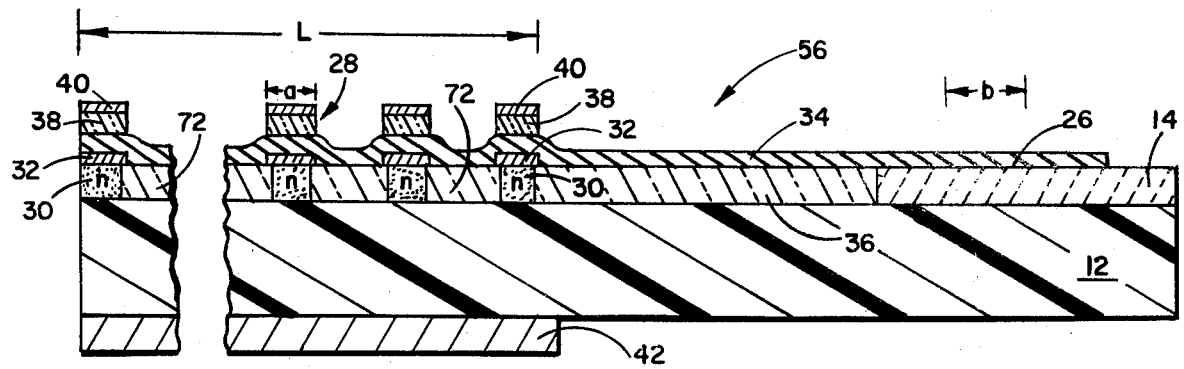
FIG. 7 shows a cross-section of the acoustoelectric imager of FIG. 6 taken along the line 7—7 of FIG. 6 looking in the direction of the arrows.
Figure 8:
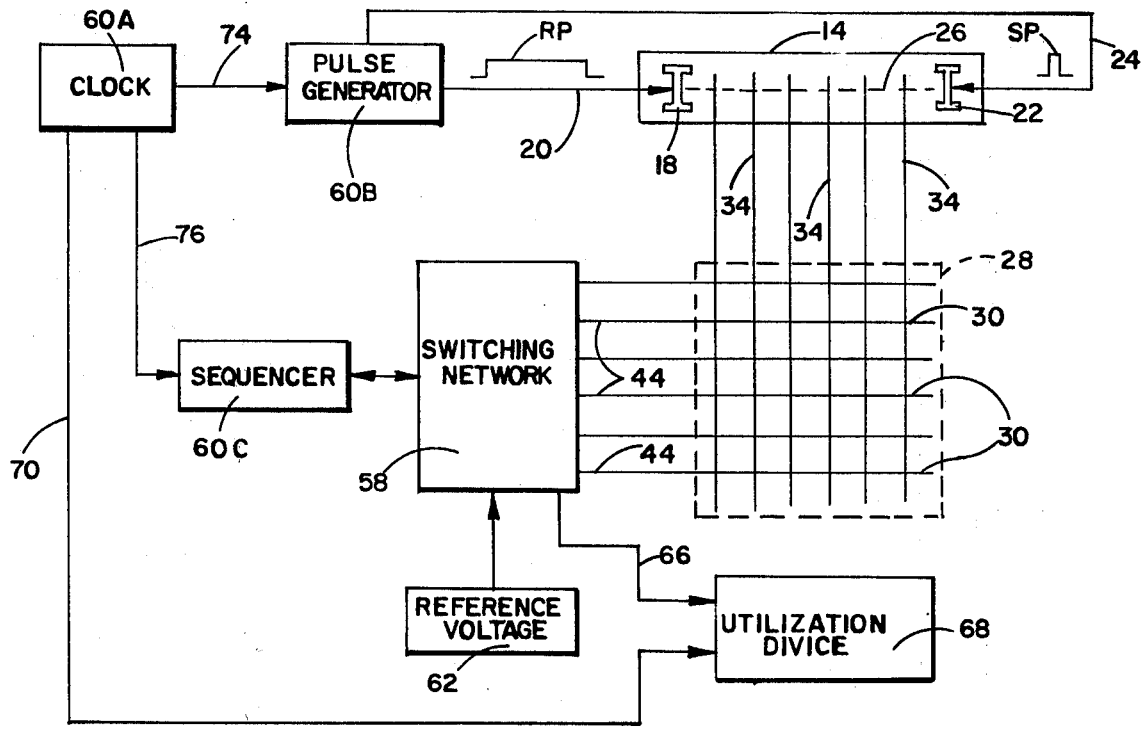
FIG. 8 is part block and part schematic diagram of an acoustoelectric imaging system employing the imager of FIGS. 6 and 7.

In FIG. 8 there is given a block diagram showing, in general terms, an imaging system using the two-dimensional acoustoelectric imager 56 of FIGS. 6 and 7. The controls 60 for the imaging system include a clock 60A for synchronizing the operation of the system. A clock output signal on line 74 synchronizes the operation of a pulse generator 60B for generating rf excitation pulses to be transduced into the reading surface acoustic wave pulse RP by interdigital transducer 18 and into the scanning surface acoustic wave pulse SP by interdigital transducer 22 (see FIG. 3). A clock output signal on line 76 is supplied to a sequencer 60C for controlling the operation of a switching network 58. The switching network 58 includes the diode bridge switching circuits for each element of the screen 28 whereby one element at a time of the screen 28 is scanned to produce a line image output signal modulated by image illumination intensity as discussed hereinabove in connection with FIGS. 6 and 7. The sequencer 60C may comprise a ring counter for clock pulses driving a decoder circuit which, in turn, provides control signals to individual diode bridge switching circuits. The switching circuits sequentially remove the bias determined by the reference voltage source 62 from a different element in the screen 28 each time a reading pulse RP is launched on the piezoelectric film 14. A line image output signal from the unbiased screen element is provided on line 66 to a utilization device 68 which may be an oscilloscope. The sweep circuits of the utilization device are synchronized to the rest of the imaging system by a signal from the clock 60A on line 70.

It should be understood, of course, the foregoing disclosure relates only to preferred embodiments of the invention and that numerous modifications may be made therein without departing from the spirit and the scope of the invention as set forth in the appended claims.

What is claimed is:
1. An acoustoelectric imager comprising:
   a. substrate means of dielectric material having first and second portions;
   b. a film of piezoelectric material disposed on the first portion of said substrate means, said film of piezoelectric material having a propagation path for surface acoustic waves thereon;
   c. means for exciting counter-propagating surface acoustic waves along said propagation path;
   d. screen means for receiving radiation projected thereon disposed on said second portion of said substrate means and including:
      1. semiconductor material sensitive to said radiation; and
      2. electrode means for sensing and applying voltage across said semiconductor material;
      3. wherein every part of said screen means and said substrate means interposed in a beam path for projected radiation intended to illuminate said semiconductor material is transparent to the projected readiation; and
   e. multistrip coupler means for sensing electric fields associated with surface acoustic waves on said propagation path and for causing said electric fields to interact with charge carriers in said semiconductor material.

2. An acoustoelectric imager as recited in claim 1 wherein said semiconductor material included in said screen means is an elongated strip of said semiconductor material.

3. An acoustoelectric imager as recited in claim 1 wherein said semiconductor material included in said screen means is a plurality of elongated strips of said semiconductor material substantially parallel to and spaced apart from each other.

4. An acoustoelectric imager as recited in claim 3 wherein said electrode means provides means for sensing and applying voltage across an individual one of said plurality of elongated strips of semiconductor material.

5. An acoustoelectric imager as recited in claim 4 which comprises switching means for coupling said electrode means for an individual one of said plurality of elongated strips of said semiconductor material to a utilization device for image output signals.

6. An acoustoelectric imager as recited in claim 5 wherein said switching means provides means for coupling said electrode means for an individual one of said plurality of elongated strips of said semiconductor material to a source of bias voltage.

7. An acoustoelectric imager as recited in claim 6 which comprises means for controlling said switching means to sequentially couple each of said electrode means for an individual one of said plurality of elongated strips of said semiconductor material to a utilization device for a time sufficient to scan a line image illuminating the individual one of said plurality of elongated strips of semiconductor material so coupled.

8. An acoustoelectric imager as recited in claim 7 wherein said means for controlling said switching means controls said switching means to couple each of said electrode means for an individual one of said plurality of elongated strips of semiconductor material to a source of bias voltage whenever said electrode means for an individual one of said plurality of elongated strips of semiconductor material is not coupled to a utilization device.

9. The acoustoelectric imager recited in claim 1 including
   a layer of insulating material disposed on said substrate means intermediate said film of piezoelectric material and said screen means.

* * * * *